US010274896B2

(12) United States Patent
Suginohara (10) Patent No.: US 10,274,896 B2
(45) Date of Patent: Apr. 30, 2019

(54) FLOATING IMAGE DISPLAY DEVICE (71) Applicant: Mitsubishi Electric Corporation, Tokyo (JP)

(72) Inventor: Hidetsugu Suginohara, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 183 days.

(21) Appl. No.: 15/411,619

(22) Filed: Jan. 20, 2017

(65) Prior Publication Data
US 2017/0227929 A1 Aug. 10, 2017

(30) Foreign Application Priority Data

Feb. 10, 2016 (JP) ................................. 2016-023770

(51) Int. Cl.
G03H 1/22 (2006.01)
G02B 27/10 (2006.01)
(Continued)

(52) U.S. Cl.
CPC ......... *G03H 1/2202* (2013.01); *G02B 27/106* (2013.01); *G02B 27/144* (2013.01);
(Continued)

(58) Field of Classification Search
CPC .. G02B 27/106; G02B 27/2292; G02B 5/124; G03H 1/0005; G03H 1/2202;
(Continued)

(56) References Cited

U.S. PATENT DOCUMENTS 5,886,818 A * 3/1999 Summer ................ G02B 27/22
359/478
2002/0101657 A1* 8/2002 Min ......................... G02B 5/32
359/462

(Continued)

FOREIGN PATENT DOCUMENTS

JP 2009-25776 A 2/2009
JP 2009-276698 A 11/2009

(Continued)

OTHER PUBLICATIONS

Japanese Office Action for Japanese Application No. 2016-023770, dated Aug. 7, 2018, with machine translation.
(Continued)

*Primary Examiner* — Peter D Le
(74) *Attorney, Agent, or Firm* — Birch, Stewart, Kolasch & Birch, LLP (57) ABSTRACT A floating image display device includes a floating-image-formation optical system that forms an image at an opening part as a floating image from an image displayed on an image display unit, an authentication unit that judges whether or not a subject passing through the opening part is an authorized subject, and an image control unit that makes the image display unit switch contents of the image when the subject is judged as the authorized subject. The floating-image-formation optical system can include a beam splitter and a retroreflective sheet. Another floating image display device includes an image display unit that displays a first image, a floating-image-formation optical system that forms an image at an opening part as a floating image from the first image, and an image projection unit that projects a second image onto a subject moving through the floating image when the subject passes through the opening part.

8 Claims, 8 Drawing Sheets (51) Int. Cl.
  *G03H 1/00* (2006.01)
  *G02B 27/14* (2006.01)
  *G02B 27/22* (2018.01)

(52) U.S. Cl.
  CPC ....... *G02B 27/2221* (2013.01); *G03H 1/0005* (2013.01); *G03H 2001/2231* (2013.01); *G03H 2223/24* (2013.01); *G03H 2226/05* (2013.01); *G03H 2240/40* (2013.01)

(58) Field of Classification Search
  CPC ....... G03H 2001/2231; G03H 2223/24; G03H 2226/05; G03H 2240/40
  See application file for complete search history.

(56) References Cited

U.S. PATENT DOCUMENTS

| | | |
|---|---|---|
| 2010/0110384 A1 | 5/2010 | Maekawa |
| 2010/0177402 A1 | 7/2010 | Maekawa |
| 2011/0181949 A1* | 7/2011 | Hashikawa .......... G02B 17/006 359/463 |
| 2011/0285965 A1 | 11/2011 | Sugiyama |
| 2016/0219260 A1* | 7/2016 | Sato .................... H04N 13/0402 |
| 2016/0292939 A1 | 10/2016 | Warnitz et al. |
| 2017/0099480 A1* | 4/2017 | Kaneda ................ G02B 5/124 |

FOREIGN PATENT DOCUMENTS

| | | |
|---|---|---|
| JP | 2010-244292 A | 10/2010 |
| JP | 2011-150221 A | 8/2011 |
| JP | 2011-242729 A | 12/2011 |
| JP | 2015-226296 A | 12/2015 |
| WO | WO 2008/123500 A1 | 10/2008 |
| WO | WO 2013/005305 A1 | 1/2013 |
| WO | WO 2014/041977 A1 | 3/2014 |
| WO | WO 2015/075138 A1 | 5/2015 |
| WO | WO 2016/017445 A1 | 2/2016 |

OTHER PUBLICATIONS

"Mitsubishi Electric Develops 'Aerial Display' that Projects Large Images Midair", Mitsubishi Electric Corporation Public Relations Division, 2016, 2 pages.

\* cited by examiner

FLOATING IMAGE DISPLAY DEVICE

BACKGROUND OF THE INVENTION

1. Field of the Invention

The present invention relates to a floating image display device for displaying a floating image in the air where there are no display elements.

2. Description of the Related Art

Devices employing floating image display technology, for displaying a floating image in the air where there are no display elements, have been devised. For example, International Publication WO2014/041977 (Patent Document 1) discloses a device that generates a floating image by use of a plasma emission phenomenon of laser plasma and a device that uses a floating image, displayed by projecting multiple laser beams to make the beams intersect in the air, as an alternative to a wall, a partition, an entrance/crossing gate at a railway crossing or a station's ticket barrier. However, it is undesirable to place a floating image generated by use of the plasma emission phenomenon in the vicinity of a human body. Further, the method of displaying a floating image by projecting multiple laser beams needs a countermeasure for preventing the laser beams from directly entering a human eye.

In such a circumstance, there has been devised a technology for projecting a display image displayed on a flat panel display or the like onto a space in the air where there are no display elements. For example, Japanese Patent Application Publication No. 2009-276698 (Patent Document 2) discloses a technology that employs a dihedral corner reflector array formed by arranging a great number of dihedral corner reflectors on a plane, and thereby forms a floating image from the display image in a space at a position plane-symmetrical with respect to the dihedral corner reflector array to display the floating image as a real image in the air.

Further, Japanese Patent Application Publication No. 2009-25776 (Patent Document 3) discloses a technology that employs a half mirror and a retroreflective sheet, and thereby forms a floating image from the display image in a space at a position plane-symmetrical with respect to the half mirror to display the floating image as a real image in the air.

In the floating image displayed in the air by using the technology described in Patent Document 2 or Patent Document 3, part of optical paths for forming the floating image are interrupted by a hand or body of a person moving through the floating image, and thus part of the floating image is not formed and there are cases where a person viewing the floating image (viewer or waiting person) has a feeling of strangeness or physiological discomfort.

SUMMARY OF THE INVENTION

An object of the present invention is to provide a floating image display device capable of restraining the feeling of strangeness or physiological discomfort felt by a person viewing a floating image when a person or object goes through the floating image.

To resolve such problems, one aspect of the present invention provides a floating image display device for displaying an image at an opening part that is open as an entrance through which a subject passes, the floating image display device including an image display unit that displays a display image, a floating-image-formation optical system that forms the image at the opening part as a floating image from the display image, an authentication unit that judges whether or not the subject passing through the opening part is an authorized subject authorized to pass through the opening part, and an image control unit that makes the image display unit switch contents of the display image when the subject is judged as the authorized subject. The floating-image-formation optical system includes any one of a beam splitter for splitting incident light into transmitted light and reflected light and a retroreflective sheet for retroreflecting light incident via the beam splitter, or includes a dihedral corner reflector array including a plurality of dihedral corner reflectors arranged on a plane.

Another aspect of the present invention provides a floating image display device for displaying an image at an opening part that is open as an entrance through which a subject passes, the floating image display device including an image display unit that displays a first image, a floating-image-formation optical system that forms the image at the opening part as a floating image from the first image, and an image projection unit that projects a second image onto the subject moving through the floating image when the subject passes through the opening part.

According to the present invention, the feeling of strangeness or physiological discomfort felt by a person viewing the floating image can be restrained when a person or object moves through the floating image.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
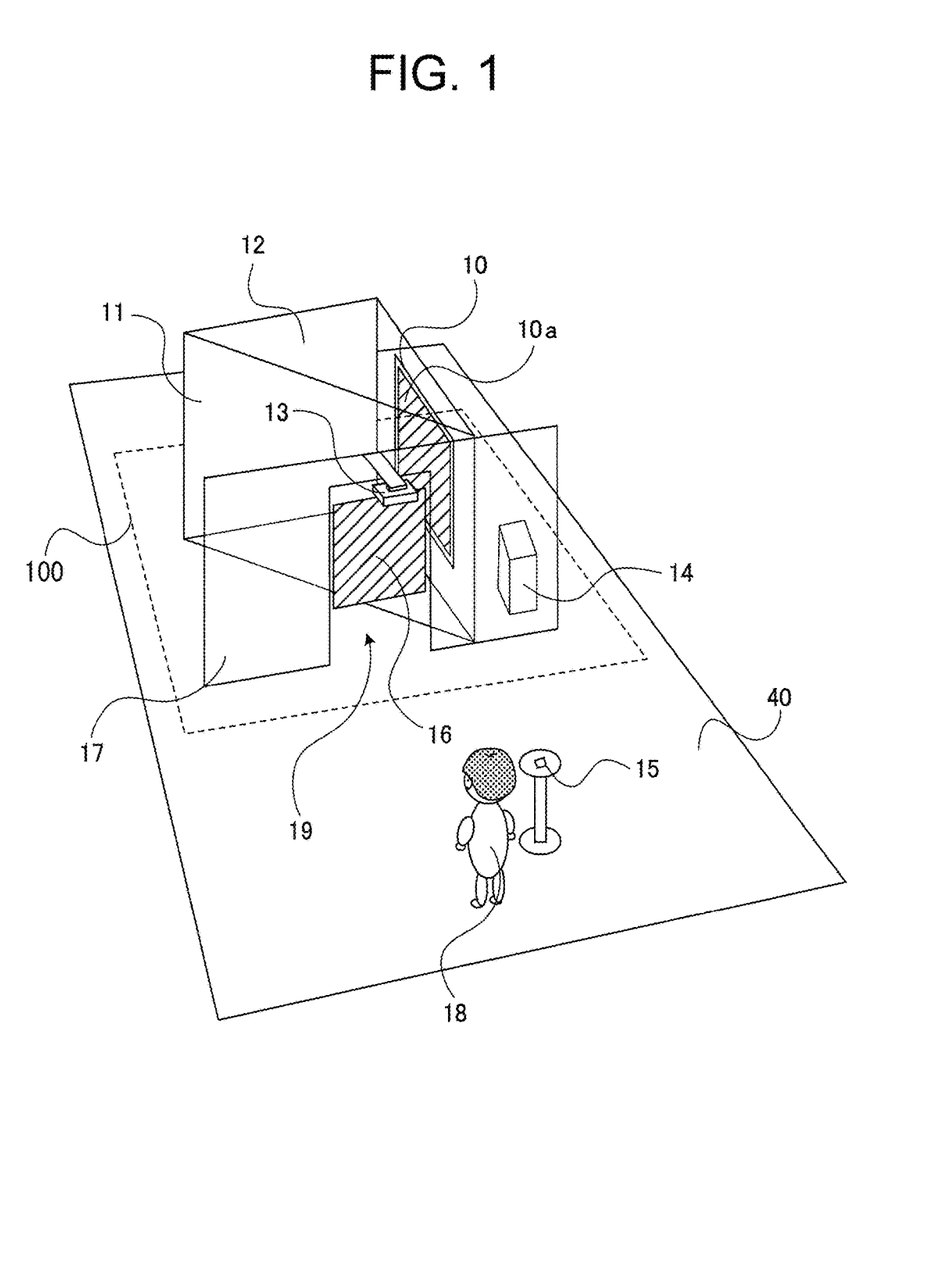
FIG. 1 is a bird's-eye view schematically showing the configuration of a floating image display device according to a first embodiment.

FIG. 1 is a bird's-eye view schematically showing the configuration of a floating image display device 100 according to a first embodiment of the present invention. In FIG. 1, the floating image display device 100 includes an image display unit 10, a beam splitter 11, a retroreflective sheet 12, an image projection unit 13, an image control unit 14 and an authentication unit 15. In the example shown in FIG. 1, the image display unit 10, the beam splitter 11 and the retroreflective sheet 12 are arranged so that a display surface of the image display unit 10, surfaces (a light reflection/incidence surface and a light exit surface) of the beam splitter 11 and a surface of the retroreflective sheet 12 on a retroreflecting side are substantially orthogonal to a floor surface 40 serving as a reference plane. An image (first image) displayed on the image display unit 10 is displayed as a floating image 16 at an opening part 19 of a wall 17 by a floating-image-formation optical system made up of the beam splitter 11 and the retroreflective sheet 12. A passing person 18 who is going to pass through the opening part 19 performs an authentication operation on the authentication unit 15. On the basis of the authentication operation, the authentication unit 15 judges whether or not the passing person 18 is an authorized subject who has been authorized to pass through the opening part 19. The image control unit 14 switches the image displayed on the image display unit 10 depending on the result of the judgment. When the result of the judgment by the authentication unit 15 is "The passing person 18 is an authorized subject.", that is, when the passing person 18 who performed the authentication operation is authenticated as the authorized subject, the contents of the floating image 16 at the opening part 19 change and the passing person 18, seeing the changed floating image 16, passes through the opening part 19 of the wall 17 like moving through the floating image 16. As above, the floating image display device 100 operates as an entry gate which is equipped with an authentication function and is using the opening part 19 of the wall 17 as an entrance. The image projection unit 13, installed above the opening part 19 of the wall 17, is a device for projecting an image (second image) towards the opening part 19 of the wall 17.

Figure 8:
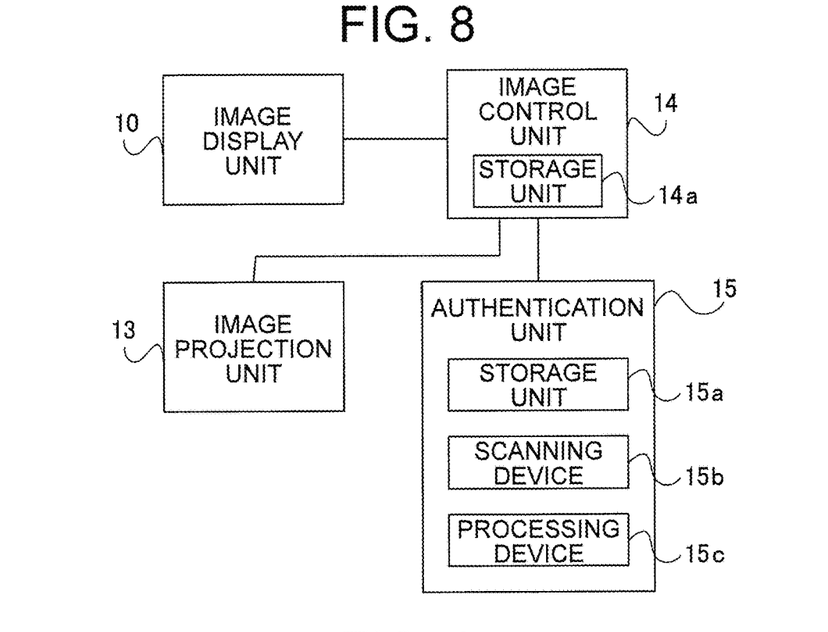
FIG. 8 is a block diagram showing the general configuration of the floating image display device according to the first embodiment.

FIG. 8 is a block diagram showing the general configuration of the floating image display device 100 according to the first embodiment. As shown in FIG. 8, the image control unit 14 outputs image signals to the image display unit 10 and the image projection unit 13. The image control unit 14 controls the image displayed on the image display unit 10 and the image displayed by the image projection unit 13 on the basis of the result of the judgment by the authentication unit 15.

Figure 2:
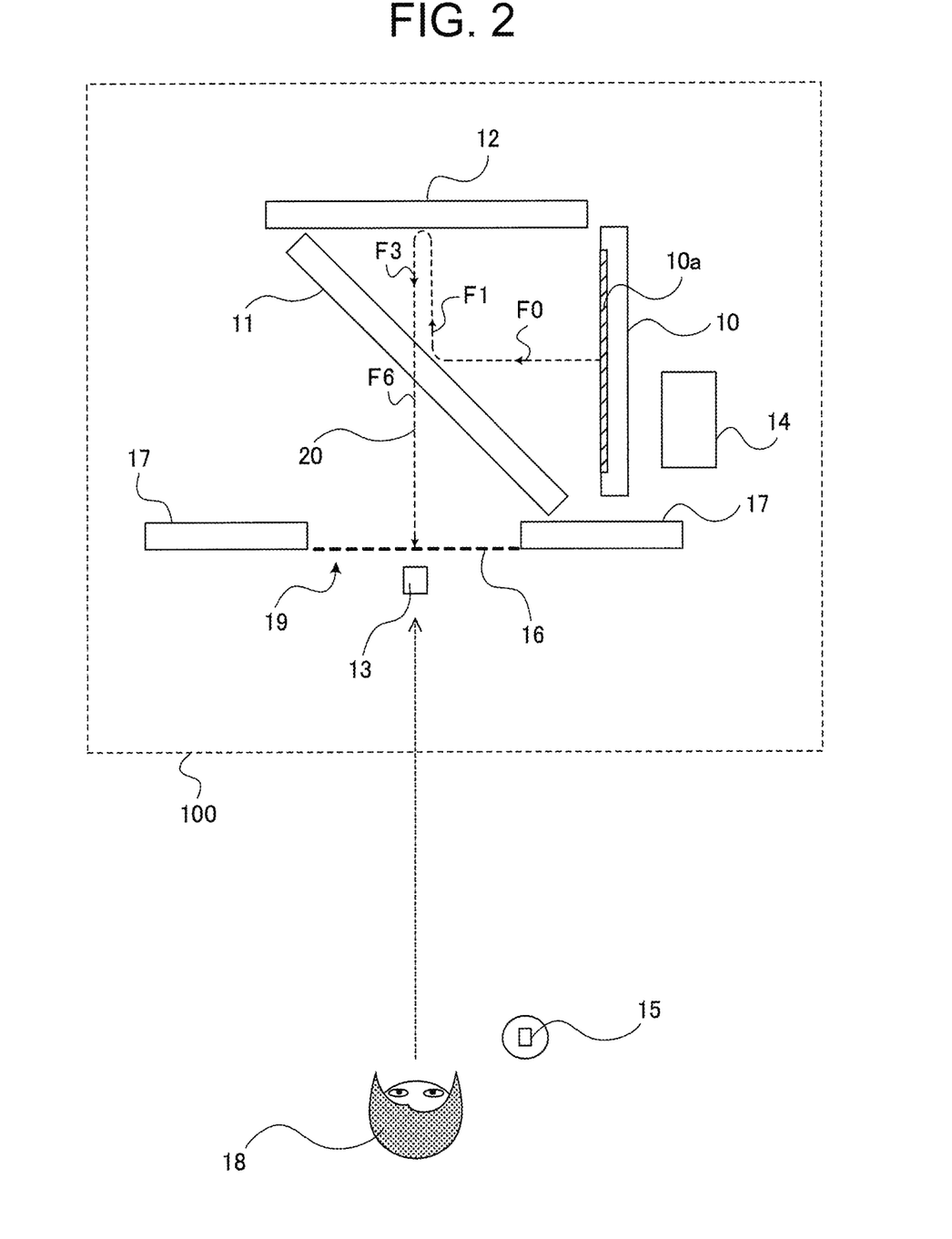
FIG. 2 is a top view schematically showing the configuration of the floating image display device according to the first embodiment.
Figure 9:
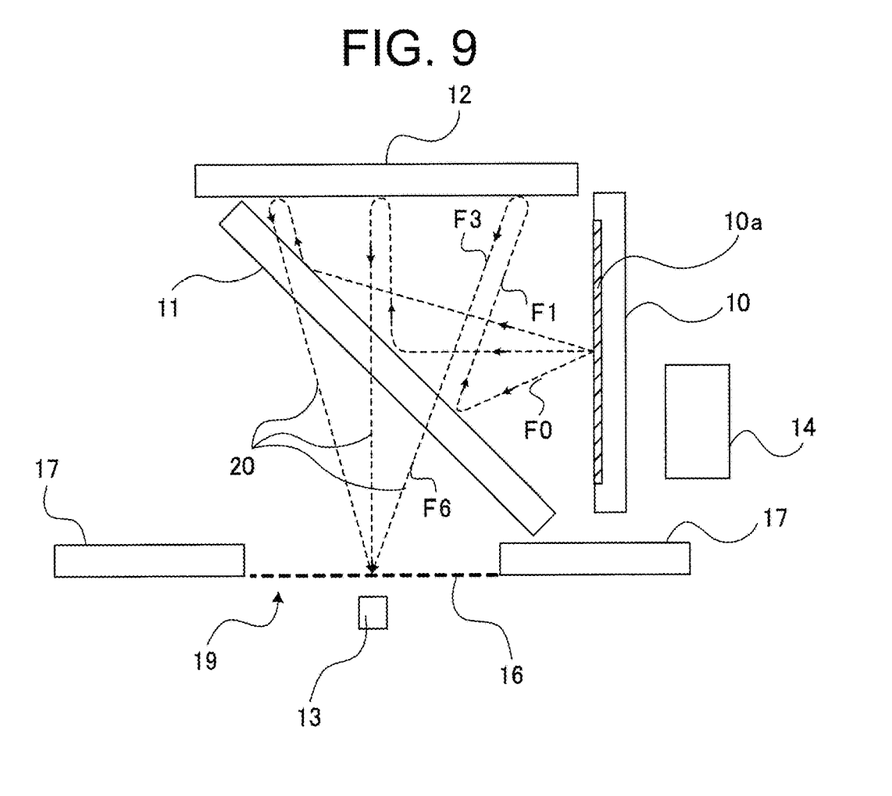
FIG. 9 is an enlarged top view showing the configuration of an optical system of the floating image display device shown in FIG. 2 and its principal optical paths.

FIG. 2 is a top view schematically showing the configuration of the floating image display device 100 according to the first embodiment of the present invention. Since the configuration shown in FIG. 2 is equivalent to the configuration shown in FIG. 1, reference characters identical with those shown in FIG. 1 are assigned to the components shown in FIG. 2 and repeated explanation thereof is omitted here. FIG. 2 illustrates the positional relationship among the components of the floating image display device 100. FIG. 9 is an enlarged top view showing the configuration of the optical system of the floating image display device 100 shown in FIG. 2 and its principal optical paths 20.

In the following description, details of the configuration of the floating image display device 100 will be described with reference to FIG. 1, FIG. 2, FIG. 8 and FIG. 9.

The image display unit 10 displays the image by using a means with light emission. The image display unit 10 is, for example, a liquid crystal display including a liquid crystal layer (e.g., transmissive liquid crystal layer) and a backlight as the means with light emission. Such a liquid crystal display displays the image 10a by modulating intensity of light emitted from the backlight in regard to each pixel by using the liquid crystal layer. From the surface (display surface) of the liquid crystal display, a set of modulated rays of light is emitted as image light. The image display unit 10 may also be an image display device other than a liquid crystal display. For example, the image display unit 10 may also be an image display device of a self-luminous type such as a plasma display, an organic EL (ElectroLuminescence) display or an LED (Light-Emitting Diode) display. The image display unit 10 may also be made up of a screen as the display surface arranged at the position indicated as the image 10a in FIG. 2 and a projector for projecting the image onto the screen. In this case, light is emitted from a light source of the projector, the image light is produced by modulating the emitted light according to the image signal, and the display image 11 is displayed on the screen by diffused reflection on the screen of the image light. As above, the image display unit 10 displays the image 10a based on the image signal outputted from the image control unit 14.

The beam splitter 11 is an optical element having a feature of splitting incident light into a transmitted light component and a reflected light component. The beam splitter 11 is a half mirror, for example. The half mirror is a mirror that splits the incident light so that the transmitted light component and the reflected light component are equal (or substantially equal) to each other in intensity. However, the transmitted light component and the reflected light component do not necessarily have to be equal in intensity; there can be a difference between intensity of the transmitted light component and that of the reflected light component. For example, the beam splitter 11 may be formed of a colorless and transparent glass plate or acrylic plate. In the case of the glass plate or acrylic plate, the intensity of the transmitted light component is higher than that of the reflected light component. Compared to the half mirror, the colorless and transparent glass plate or acrylic plate has a characteristic that an optical absorption rate is low. In the floating image display device 100, the use of an optical element having a low optical absorption rate as the beam splitter 11 has an effect of increasing luminance of the floating image 16.

As indicated by the optical paths 20 in FIG. 2 and FIG. 9, the retroreflective sheet 12 is a flat sheet-shaped optical element having a retroreflective function to reflect incident light directly towards a direction of incidence. Put another way, an optical path in a first direction as the traveling direction of the incident light and an optical path in a second direction as a traveling direction of retroreflected light are parallel (or substantially parallel) to each other and the first and second directions are opposite to each other. The optical path of the incident light in the first direction and the optical path of the retroreflected light in the second direction are desired to overlap each other. The optical element having the retroreflective function is referred to also as a retroreflector. The retroreflective sheet 12 as the optical element having the retroreflective function can be of a bead type made by closely arranging a plurality of small glass beads all over a mirror surface or of a microprism type made by closely arranging a plurality of small trigonal pyramids in concave shapes each of whose surfaces is formed as a mirror surface. Details of the configuration of such a retroreflective sheet 12 are described in Patent Document 3, for example. Retroreflective sheets are commonly used for traffic signs. Providing the surface of a traffic sign with the retroreflective function has an effect in that the sign illuminated with automobile headlights in the nighttime becomes easily viewable to the drivers. The retroreflective sheet 12 is desired to be fixed in a state of being stuck on a flat plate having rigidity or the like.

As shown in FIG. 2 and FIG. 9, the beam splitter 11 is arranged in a state of being inclined by 45 degrees (or substantially 45 degrees) with respect to the display surface of the image display unit 10. Meanwhile, the retroreflective sheet 12 is arranged in a state of being inclined by 90 degrees (or substantially 90 degrees) with respect to the display surface of the image display unit 10. With such an arrangement shown in FIG. 2 and FIG. 9, the beam splitter 11 and the retroreflective sheet 12 function as the floating-image-formation optical system in the floating image display device 100 and the image 10a displayed on the display surface of the image display unit 10 is displayed as the floating image 16 at a position that is plane-symmetrical with respect to the beam splitter 11. The image display unit 10, the beam splitter 11, the retroreflective sheet 12 and the wall 17 in the floating image display device 100 are arranged so that the floating image 16 is displayed at the opening part 19 of the wall 17.

A principle for displaying the floating image 16 based on the image 10 displayed on the image display unit 10 will be explained below. Out of the light (image light) emitted as the image 10a, light F0 entering the beam splitter 11 is split into a reflected light component F1 and a transmitted light component (not shown in FIG. 2 and FIG. 9). Of these, the reflected light component F1 is incident upon the retroreflective sheet 12, undergoes the retroreflection, and thereby returns to the beam splitter 11 as retroreflected light F3. The retroreflected light F3 returning to the beam splitter 11 is further split by the beam splitter 11 into a reflected light component (not shown in FIG. 2 and FIG. 9) and a transmitted light component F6. In FIG. 2 and FIG. 9, the optical paths 20 are indicated by broken lines. Incidentally, while the optical paths 20 are drawn so that the reflected light component F1 and the retroreflected light F3 at the beam splitter 11 do not overlap each other for the sake of easy understanding, the optical paths 20 of the reflected light component F1 and the retroreflected light F3 pass through the same point (or substantially the same point) on the beam splitter 11 ideally. While the optical path 20 in FIG. 2 indicates only the optical path of light traveling from the image 10a in a direction orthogonal to the display surface of the image display unit 10, the image 10a emits light in various directions from its surface like the three optical paths illustrated in FIG. 9 as an example. In optical paths of light entering the beam splitter 11 included in the light emitted in various directions as the image 10a, light emitted from a certain point on the image 10a converges (reconverges) at a position that is plane-symmetrical with respect to the beam splitter 11. Since the reconverged light appears to be shining at the position of reconvergence to the passing person 18 as a viewer, the image 10a is visually recognized as the floating image 16.

The positional relationship among the image display unit 10, the beam splitter 11 and the retroreflective sheet 12 shown in FIG. 2 and FIG. 9 illustrates a preferred example of shapes and arrangement of these components. The installation positions and angles of the beam splitter 11 and the retroreflective sheet 12 with respect to the image display unit 10 can be changed as long as optical paths for the light from the image 10a to reconverge at the positions plane-symmetrical with respect to the beam splitter 11 can be secured.

Figure 10:
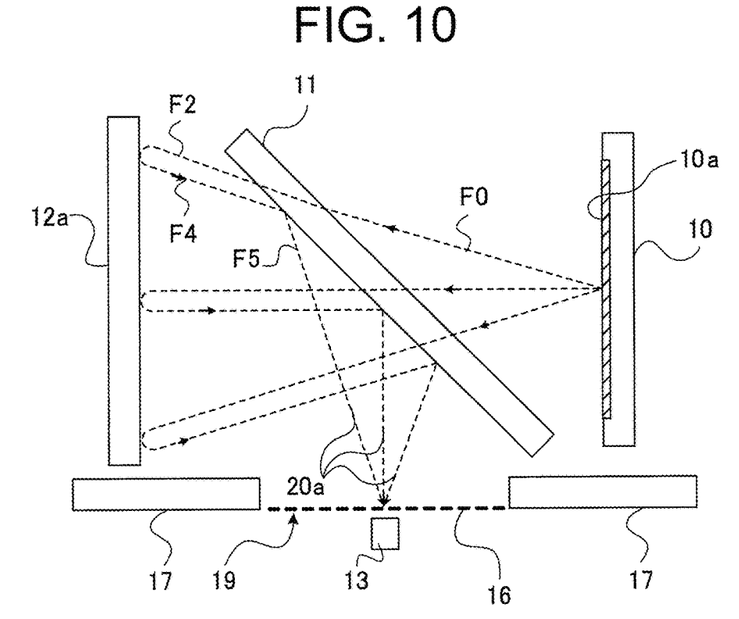
FIG. 10 is an enlarged top view showing another configuration of the optical system of the floating image display device and its principal optical paths.

FIG. 10 is an enlarged top view showing another configuration of the optical system of the floating image display device 100 and its principal optical paths. As shown in FIG. 10, a retroreflective sheet 12a may be set at a position where the distance from the image display unit 10 is longer than that of the beam splitter 11 and in a state of being in parallel with the display surface of the image display unit 10, for example. In this case, out of light F0 emitted as the image 10a, light F2 passing through the beam splitter 11 is retroreflected by the retroreflective sheet 12a. Out of light F4 retroreflected by the retroreflective sheet 12a and returning to the beam splitter 11, light F5 reflected by the beam splitter 11 (optical paths 20a) forms the floating image 16.

Figure 11:
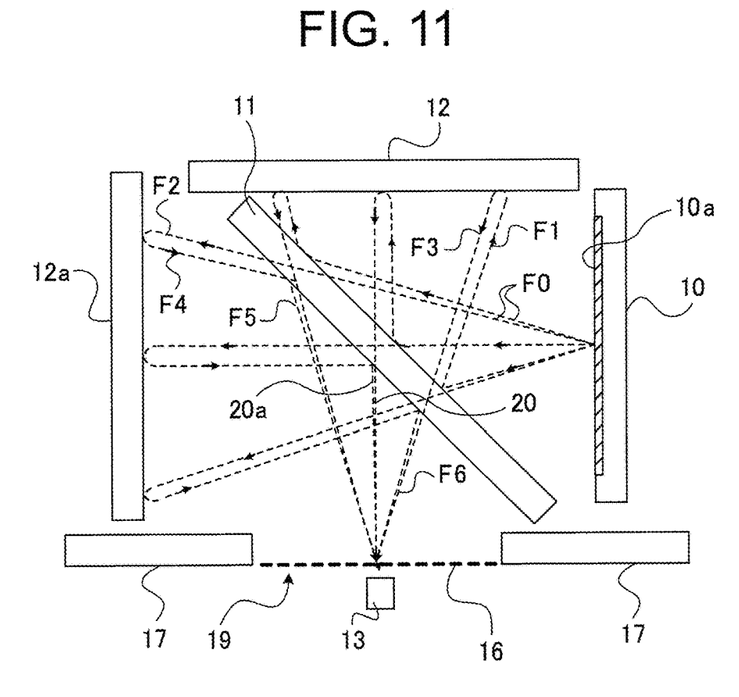
FIG. 11 is an enlarged top view showing still another configuration of the optical system of the floating image display device and its principal optical paths.

FIG. 11 is an enlarged top view showing still another configuration of the optical system of the floating image display device 100 and its principal optical paths. As shown in FIG. 11, the floating image display device 100 may include both the retroreflective sheet 12 in the state of being inclined by 90 degrees with respect to the display surface of the image display unit 10 and the retroreflective sheet 12a at the position where the distance from the image display unit 10 is longer than that of the beam splitter 11 and in the state of being in parallel with the display surface of the image display unit 10. In this case, the luminance of the floating image 16 increases since the floating image 16 is displayed with light of converging two optical paths.

The authentication unit 15 judges whether an authentication subject person is the authorized subject who has been authorized to pass through the opening part 19 or an unauthorized subject who is not authorized to pass through the opening part 19. The authentication subject person is, for example, a passing person who is going to pass through the opening part 19 (the passing person 18 shown in FIG. 1). The authentication unit 15 is a biometric authentication device, for example. The authentication unit 15 includes, for example, a storage unit (semiconductor memory, magnetic recording device or the like) 15a that previously records and stores fingerprints of registered people as a database, a scanning device 15b that optically scans a fingerprint of the authentication subject person, and a processing device (e.g., processor operating according to a software program) 15c that judges whether the authentication subject person is a registered person or not by verifying the scanned fingerprint against the fingerprints stored as the database. The previously recorded biometric signal (biometric information) is not limited to the fingerprint but can also be a different type of biometric information such as a retinal pattern, iris or finger vein as long as each individual can be identified. Besides, the authentication unit 15 can also be an IC (Integrated Circuit) card reader capable of identifying each individual. The IC card reader judges whether the authentication subject person is a registered person or not by verifying information stored in an IC card carried by the authentication subject person against a database.

The image control unit 14 outputs the image signals of images to be displayed to the image display unit 10 and the image projection unit 13 depending on the result of the authentication by the authentication unit 15. In this embodiment, it is assumed that a plurality of images have been stored in a storage unit 14a of the image control unit 14. It is also possible to use images inputted from the outside of the image control unit 14.

Figure 3:
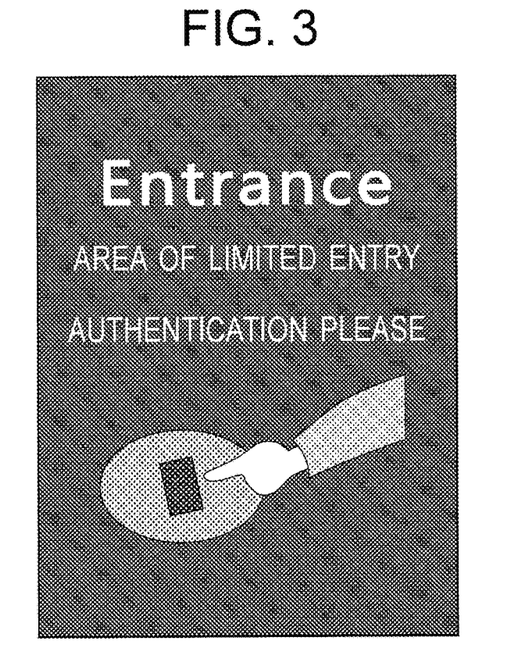
FIG. 3 is a diagram showing an example of a floating image in the first embodiment.
Figure 4:
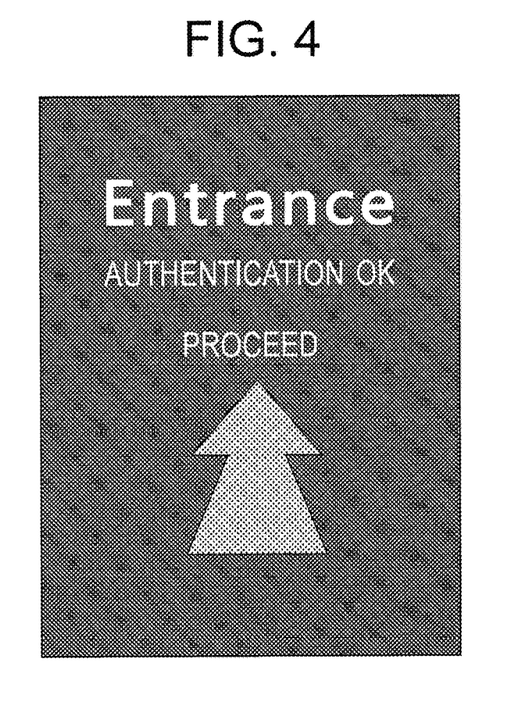
FIG. 4 is a diagram showing another example of the floating image in the first embodiment.

An example of the floating image 16 is shown in FIG. 3. FIG. 3 illustrates an image indicating a state before the authentication operation is performed on the authentication unit 15 (e.g., message display for notifying that the authentication operation has to be performed). Another example of the floating image 16 is shown in FIG. 4. FIG. 4 illustrates an image indicating that the authentication has been performed correctly as the result of the authentication operation by the passing person 18 on the authentication unit 15 (e.g., message display for notifying of AUTHENTICATION OK meaning that the passage has been permitted). The passing person 18 after the authentication operation sees the image shown in FIG. 4 and passes through the opening part 19 of the wall 17 like moving through the floating image 16.

It is possible to move through the floating image 16 anytime. For example, even when the image shown in FIG. 3 is displayed, the passing person 18 can move through the opening part 19 of the wall 17 without performing the authentication operation. However, a certain warning can be given to the passing person 18 by displaying an instruction not to move through, such as "LIMITED ENTRY" shown in FIG. 3. In conventional entry gates, the authentication operation before passage is prompted by placing a physical bar or the like. In contrast, the floating image display device 100 of this embodiment displays the floating image 16 in place of the physical bar. Compared to the physical bar, the floating image 16 is capable of showing a wider variety of information. Further, since the image can be displayed in front of the eyes of the passing person, a greater amount of information can be conveyed correctly to the passing person.

When a person passes through the opening part 19 of the wall 17 while moving through the floating image 16, part of the optical paths for forming the floating image 16 are interrupted by a body of the passing person, and accordingly, part of the floating image 16 is not formed. When a person is moving through the floating image 16, for another person (viewer or waiting person) viewing the floating image 16 from the outside (front side), the state in which the floating image 16 existing in front of the passing body is made unviewable by the body of the person moving through the floating image 16 is a phenomenon contradictory to depth perception, and the waiting person 51 has a feeling of strangeness or physiological discomfort.

Figure 5:
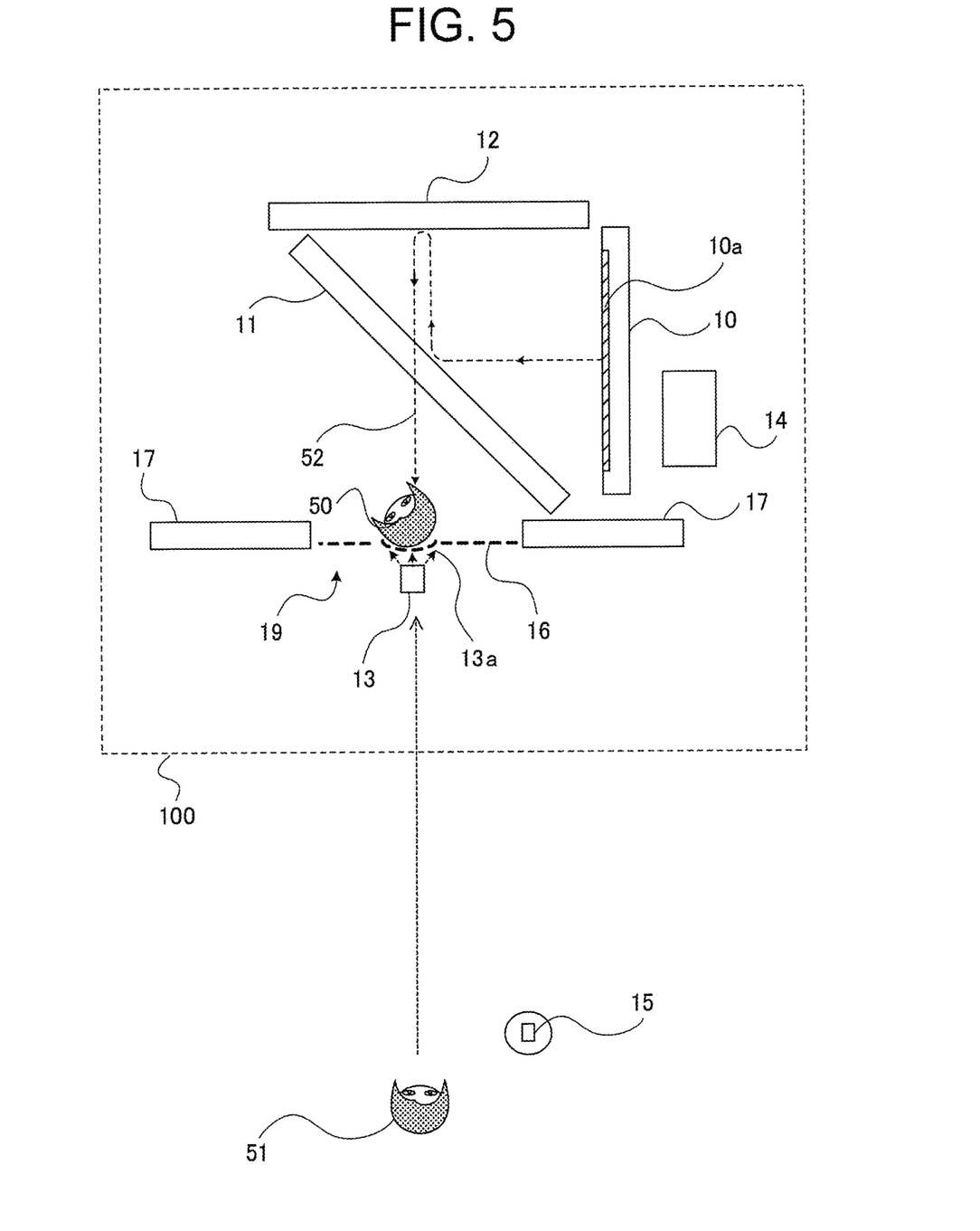
FIG. 5 is a diagram showing a state just after a passing person passed through an opening part of a wall while moving through the floating image in the first embodiment.

FIG. 5 is a diagram showing a state in which a passing person 50 passes through the opening part 19 of the wall 17 while moving through the floating image 16. The passing person 50 after performing the authentication operation on the authentication unit 15 passes through the opening part 19 of the wall 17 like moving through the floating image 16. A waiting person 51 is waiting in the vicinity of the authentication unit 15 to pass through the opening part 19 of the wall 17 after the passing person 50.

Figure 6:
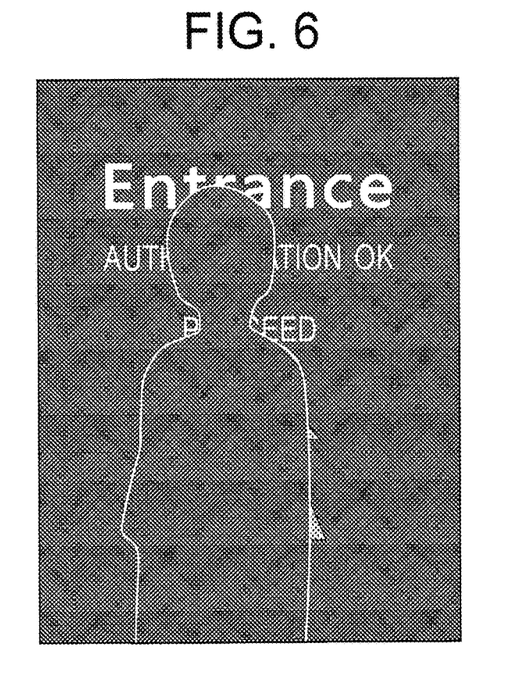
FIG. 6 is a diagram showing an image viewed by a waiting person in the state shown in FIG. 5.

FIG. 6 is a diagram showing an image viewed by the waiting person 51 in the state shown in FIG. 5. In FIG. 6, an image corresponding to the result of the authentication of the passing person 50 is displayed as the floating image 16; however, part of the floating image 16 becomes unviewable due to the body of the passing person 50. The perimeter of the body of the passing person 50 is drawn in FIG. 6 for the sake of easy understanding. In FIG. 5, an optical path for forming the floating image 16 is indicated as an optical path 52. The optical path 52 is interrupted by the passing person 50 and does not reconverge as the floating image 16. As above, when an object exists between the floating image 16 and the beam splitter 11, there arise optical paths from the image 10a displayed on the image display unit 10 that cannot reconverge as the floating image 16 and part of the floating image 16 becomes unviewable.

In general, the state in which part of an image becomes unviewable occurs when an object exists in front of the image. However, for the waiting person 51, the floating image 16 becomes unviewable due to the body of the passing person 50, even though the passing person 50 exists behind the floating image 16. This phenomenon will be referred to as occlusion contradiction since the image becomes unviewable contradictorily to the depth perception of the waiting person 51. If the occlusion contradiction occurs in the visual field of the waiting person 51 as a person viewing the floating image 16 when the passing person 50 moves through the floating image 16 at the opening part 19, the waiting person 51 has the feeling of strangeness or physiological discomfort.

In the state shown in FIG. 5, what mitigates the feeling of strangeness or physiological discomfort caused by the occlusion contradiction is the image 13a projected from the image projection unit 13. In this embodiment, the image projection unit 13 is a projector installed above the opening part 19 of the wall 17 as shown in FIG. 1. The image projection unit 13 receives an input of the image signal outputted by the image control unit 14. The image control unit 14 outputs the image signals of the same contents to the image display unit 10 and the image projection unit 13. Namely, the image 13a projected by the image projection unit 13 and the floating image 16 are identical with each other in the contents.

Figure 7:
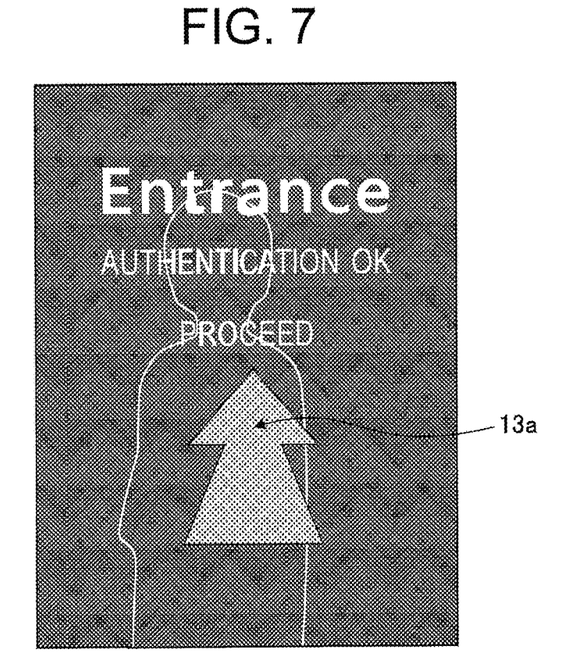
FIG. 7 is a diagram showing an image viewed by the waiting person when an image projected by an image projection unit is displayed on a body of the passing person in the first embodiment.

The image projection unit 13 projects the inputted image towards the floating image 16 so as to make the projected image coincide with size of the floating image 16. Then, as shown in FIG. 5, when the passing person 50 passes through the opening part 19 of the wall 17 while moving through the floating image 16, the body of the passing person 50 serves as a screen and the image projected by the image projection unit 13 is displayed on the body of the passing person 50. FIG. 7 is a diagram showing an image viewed by the waiting person 51 when the image projected by the image projection unit 13 is displayed on the body of the passing person 50. As shown in FIG. 7, the image projected by the image projection unit 13 appears in the part of the floating image 16 that became unviewable in FIG. 6 due to the body of the passing person 50. Although the image projected by the image projection unit 13 has a certain distortion due to undulations on the body of the passing person 50, the image shown in FIG. 7 is no longer an image causing the waiting person 51 to feel the occlusion contradiction. As above, by having the image projection unit 13 project the image of the same contents as the floating image 16 towards a subject passing through the opening part 19 of the wall 17 while the subject moving through the floating image 16, it becomes possible to restrain the feeling of strangeness or physiological discomfort felt by the waiting person 51 viewing the floating image 16 due to the occlusion contradiction.

While the image projection unit 13 in FIG. 1 is installed via a wall mounting metal fitting extending from a central part of the wall 17, the method of installation is not limited to this example; the image projection unit 13 may also be installed by a method like suspending it from the ceiling. It is also possible to install the image projection unit 13 to project the image 13a from the vicinity of the floor surface. It is desirable to install the image projection unit 13 in a way not hindering the passing person 50 from passing through the opening part 19 of the wall 17. Further, the image projection unit 13 is desired to be set at a position as close to the wall 17 as possible. If the image projection unit 13 is set at a position apart from the wall 17, an angle of the projection of the image 13a from the image projection unit 13 towards the position of the floating image 16 becomes shallow. Here, the angle means an angle made by the direction of the projection of the image from the image projection unit 13 and a direction of a line extending horizontally from the image projection unit 13. If the angle is shallow, the image 13a from the image projection unit 13 is projected onto the beam splitter 11 or the retroreflective sheet 12. If an image is seen on the beam splitter 11 or the retroreflective sheet 12, the visibility of the floating image 16 deteriorates significantly. Further, there are cases where the surface of the retroreflective sheet 12 has a feature of causing not only retroreflection but also specular reflection. When the angle is shallow in the same way, light from a light source of the image projection unit 13 after undergoing the specular reflection by the retroreflective sheet 12 can enter the visual field of the waiting person 51. Since the light from the light source of the image projection unit 13 undergoing the specular reflection makes the retroreflective sheet 12 glaring, the visibility of the floating image 16 deteriorates significantly. For these reasons, the image projection unit 13 is desired to project the image at a deep angle from a position close to the wall 17. A projector of a short projection distance is suitable as such an image projection unit 13.

As mentioned earlier, the floating image display device 100 in this embodiment displays the image 10a displayed on the image display unit 10 as the floating image 16 at the position plane-symmetrical with respect to the beam splitter 11. In the floating image 16, there are cases where blurring, a drop in the luminance, a drop in contrast or the like occurs in comparison with the image 10a displayed on the image display unit 10. This is dependent on the performance of the floating-image-formation optical system and the length of the optical path through which the light of the image 10a displayed on the image display unit 10 reconverges as the floating image 16.

A cause of the blurring of the floating image 16 is as follows: Light entering the beam splitter 11 is split into a transmitted light component and a reflected light component at the front surface of the beam splitter 11. The transmitted light component that passed through the inside of the beam splitter 11 is split again into a transmitted light component and a reflected light component at the back surface of the beam splitter 11 (surface opposite to the front surface). Thus, an optical path deviated from the optical path 20 by approximately the thickness of the beam splitter 11 is formed and the floating image 16 appears as a double image.

Another cause of the blurring of the floating image 16 is a deviation of the retroreflection direction in the retroreflective sheet 12. It is difficult for the retroreflective sheet 12 to reflect every ray of the incident light towards the direction of incidence and rays of light having slight angles from the direction of incidence are also caused by the reflection. These rays of light having slight angles from the direction of incidence converge around reconvergence point to which the optical paths 20 reach, for example, and thereby the blurring of the floating image 16 occurs. This is also related with the length of the optical path through which the light of the image 10a reconverges as the floating image 16. With increase in the length of the optical path, the reconvergence takes place in a larger region compared with the reconvergence point and the blurring of the floating image 16 increases.

A cause of the drop in the luminance of the floating image 16 is the splitting of the image light as the image 10a in the beam splitter 11. The optical path 20 as one of the optical paths reconverging as the floating image 16 is incident upon the beam splitter 11 twice. Put another way, in FIG. 2, the optical path 20 uses the reflected light component F1 at the first entrance into the beam splitter 11 and uses the transmitted light component F6 at the second entrance. In FIG. 10, the optical path 20 uses the transmitted light component F2 at the first entrance into the beam splitter 11 and uses the reflected light component F5 at the second entrance. In these cases, one of the transmitted light component and the reflected light component does not reconverge as the floating image 16 (i.e., is not used for the displaying of the floating image 16). Due to the light component not reconverging, the luminance of the floating image 16 drops.

A cause of the drop in the contrast of the floating image 16 is the retroreflective sheet 12 existing as a background of the floating image 16 as viewed from the viewer 18. There exist retroreflective sheets 12 of various colors, among which those providing high intensity of the retroreflected light are white or silver. If such a bright color exists in the background of the floating image 16, the floating image 16 looks whitish, with lower contrast.

The image projection unit 13 projects the image of the same contents as the floating image 16 towards the subject moving through the floating image 16. At that time, it is desirable for the image projection unit 13 to project the image having substantially the same level of blurring, drop in the luminance or drop in the contrast as that occurring in the floating image 16. This reduces the difference between the floating image 16 and the image 13a projected by the image projection unit 13, allows the image 13a, projected from the image projection unit 13 onto the subject moving through the floating image 16, to look like a part of the floating image 16, and makes it possible to more effectively restrain the feeling of strangeness or physiological discomfort caused by the occlusion contradiction. A process of adding the blurring, a process of lowering the luminance and a process of lowering the contrast for the image 13a projected by the image projection unit 13 may be performed in the image projection unit 13, or it is also possible to perform the blurring adding process, the luminance lowering process and the contrast lowering process for the image 13a in the image control unit 14 and output the image signal to the image projection unit 13 after the image signal undergoes these processes. Further, the image control unit 14 or the image projection unit 13 may be configured to perform at least one of the blurring adding process, the luminance lowering process and the contrast lowering process for the image 13a.

Although the image projection unit 13 projects the image 13a towards the subject passing through the opening part 19 while the subject moves through the floating image 16, the image 13a projected by the image projection unit 13 is distorted due to the undulations on the body of the passing person 50. Further, depending on a position of the passing person 50, a projection distance changes and a size of the image projected on the body of the passing person 50 changes. When the floating image 16 and the image 13a projected on the passing subject differ from each other in size, a sense of unity between the floating image 16 and the image 13a projected on the passing subject is impaired. Further, when there are undulations on the passing subject, the image 13a projected on the passing subject is distorted and the sense of unity between the floating image 16 and the image 13a projected on the passing subject is impaired. When the sense of unity is impaired, the effect of restraining the feeling of strangeness or physiological discomfort caused by the occlusion contradiction diminishes.

Figure 12:
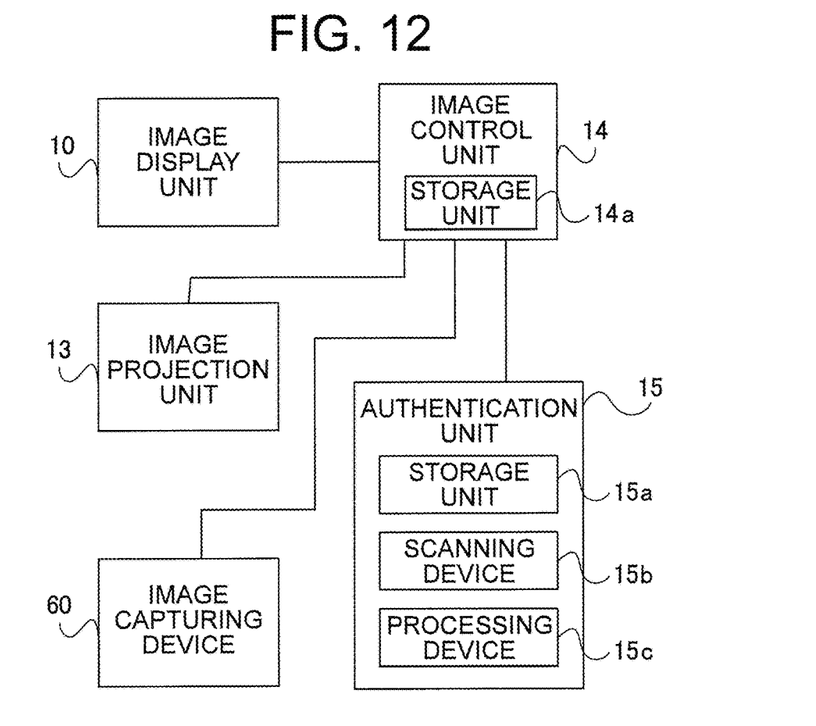
FIG. 12 is a block diagram showing the general configuration of a modification of the floating image display device according to the first embodiment.

FIG. 12 is a block diagram showing the general configuration of a modification of the floating image display device 100. To resolve the above-described problem, it is possible to capture an image of the subject moving through the floating image 16 by using an image capturing device 60 such as a camera and change the image projected from the image projection unit 13 according to at least one of a position and a shape of the passing subject (e.g., passing person). Specifically, an image of the shape of the back of the passing person moving through the floating image 16 is captured by the image capturing device 60 and the image 13a of a region coinciding with the shape of the back of the passing person is projected from the image projection unit 13 onto the back of the passing person. This makes it possible to maintain the sense of unity between the floating image 16 and the image 13a projected on the passing subject irrespective of the shape or position of the passing subject and restrain the feeling of strangeness or physiological discomfort caused by the occlusion contradiction.

Incidentally, while a case where the upper body of the passing person 50 makes part of the floating image 16 unviewable has been described in this embodiment, the present invention is applicable to any case where the occlusion contradiction occurs in the floating image 16. For example, the present invention is applicable also to a device that provides the floating image 16 with a touch panel function. Such a device has an interface used for performing a specified operation by bringing a finger close to a specified area of the floating image 16. When a finger is brought close to the floating image 16 and the finger or hand moves through the floating image 16, the occlusion contradiction occurs at that part. The feeling of strangeness or physiological discomfort caused by the occlusion contradiction can be restrained by projecting the image of the same contents as the floating image 16 from the image projection unit 13 towards the finger or hand moving through the floating image 16 similarly to the above embodiment.

Figure 13:
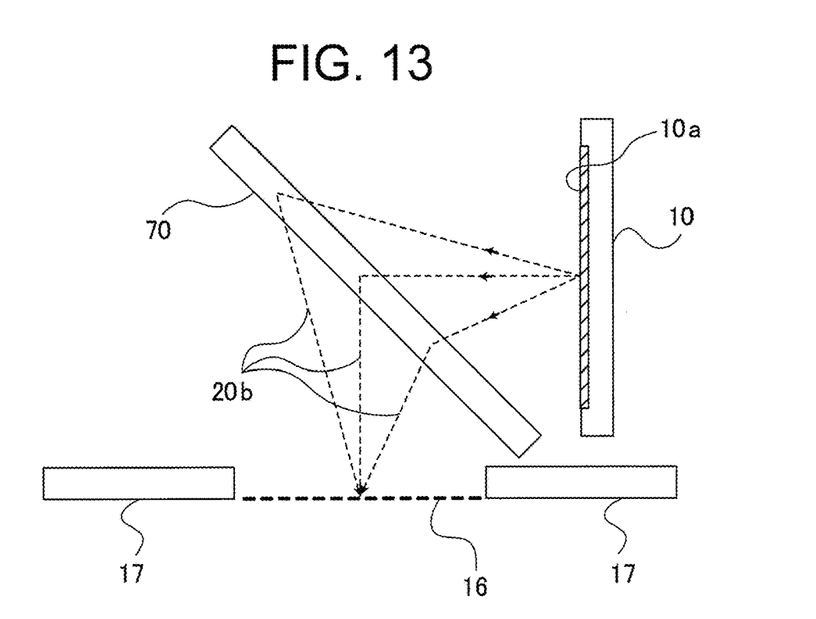
FIG. 13 is an enlarged top view showing yet another configuration of the optical system of the floating image display device and its principal optical paths.

FIG. 13 is an enlarged top view showing yet another configuration of the optical system of the floating image display device and its principal optical paths. In the above explanation, the beam splitter 11 and the retroreflective sheet 12 were used as the floating-image-formation optical system. However, it is possible as shown in FIG. 13 to display the image 10a as the floating image 16 by employing a dihedral corner reflector array 70 arranged at the position of the beam splitter 11 as another floating-image-formation optical system instead of the beam splitter 11 and the retroreflective sheet 12. The dihedral corner reflector array 70 is formed by arranging multiple pairs of orthogonally intersecting mirror surfaces perpendicularly on a plane like an array. By having incident light reflected twice by the mirror surfaces, the incident light can be bent and transmitted in a direction plane-symmetrical with respect to the dihedral corner reflector array 70. Details of the configuration of such a dihedral corner reflector array 70 are described in Patent Document 2, for example. Also when the floating-image-formation optical system of FIG. 13 is employed, out of the light emitted in various directions as the image 10a, light bent by the dihedral corner reflector array 70 reconverges on the floating image 16, by which the image 10a can be displayed as the floating image 16 in the same way. Also when the floating-image-formation optical system implemented by the dihedral corner reflector array is employed, effects equivalent to those obtained by use of the device employing the floating-image-formation optical system including the beam splitter 11 and the retroreflective sheet 12 are obtained.

DESCRIPTION OF REFERENCE CHARACTERS

10: image display unit, 10a: image (first image), 11: beam splitter, 12, 12a: retroreflective sheet, 13: image projection unit, 14: image control unit, 15: authentication unit, 16: floating image, 17: wall, 18: passing person, 19: opening part, 20, 20a, 20b: optical path, 50: passing person, 51: waiting person, 52: optical path, 60: image capturing device, 70: dihedral corner reflector array, 100: floating image display device

What is claimed is:

1. A floating image display device for displaying an image at an opening part that is open as an entrance through which a subject passes, the floating image display device comprising:
    an image display unit that displays a display image;
    a floating-image-formation optical system that forms the image at the opening part as a floating image from the display image;
    an authentication unit that judges whether or not the subject passing through the opening part is an authorized subject authorized to pass through the opening part; and
    an image control unit that makes the image display unit switch contents of the display image when the subject is judged as the authorized subject,
    wherein the floating-image-formation optical system includes any one of a beam splitter for splitting incident light into transmitted light and reflected light and a retroreflective sheet for retroreflecting light incident via the beam splitter, and a dihedral corner reflector array including a plurality of dihedral corner reflectors arranged on a plane.

2. A floating image display device for displaying an image at an opening part that is open as an entrance through which a person passes, the floating image display device comprising:
    an image display unit that displays a first image;
    a floating-image-formation optical system that forms the image at the opening part of the entrance as a floating image from the first image; and
    an image projection unit that projects a second image onto a person moving through the floating image when the person passes through the opening part of the entrance.

3. The floating image display device according to claim 2, wherein the floating-image-formation optical system includes:
    a beam splitter that splits image light emitted from the first image displayed on the image display unit into a reflected light component and a transmitted light component; and
    a retroreflective sheet that receives the reflected light component obtained by the splitting by the beam splitter, the reflected light component being incident in a first direction, the retroreflective sheet reflecting the reflected light component directly in a direction opposite to the first direction.

4. The floating image display device according to claim 2, herein the floating-image-formation optical system includes:

a beam splitter that splits image light emitted from the first mage displayed on the image display unit into a reflected light component and a transmitted light component; and a retroreflective sheet that receives the transmitted light component obtained by the splitting by the beam splitter, the transmitted light component being incident in a first direction, the retroreflective sheet reflecting the transmitted light component directly in a direction opposite to the first direction.

5. The floating image display device according to claim 3, wherein the floating-image-formation optical system further includes another retroreflective sheet that receives the transmitted light component obtained by the splitting by the beam splitter, the transmitted light component being incident in a second direction, the another retroreflective sheet reflecting the transmitted light component directly in a direction opposite to the second direction.

6. The floating image display device according to claim 2, wherein the floating-image-formation optical system includes a dihedral corner reflector array that causes image light emitted from the first image displayed on the image display unit to form the image in air.

7. The floating image display device according to claim 2, wherein the image projection unit projects the second image based on an image signal after the image signal undergoes at least one of a process of adding substantially a same level of blurring as blurring of the floating image to the second image, a process of lowering luminance of the second image to substantially a same level as luminance of the floating image and a process of lowering contrast of the second image to substantially a same level as contrast of the floating image.

8. The floating image display device according to claim 2, further comprising:

an image capturing device that captures an image of the person moving through the floating image; and an image control unit that changes a shape and a position of the second image projected by the image projection unit so that the second image projected by the image projection unit coincides with a shape of the person or a position of the person.

* * * * *